United States Patent [19]
Foster et al.

[11] 3,818,701

[45] June 25, 1974

[54] CARBURETOR INDUCTION LIMITING DEVICE

[75] Inventors: Michael R. Foster, Goodrich; Frederick J. Hartley, Columbiaville, both of Mich.

[73] Assignee: General Motors Corporation, Detroit, Mich.

[22] Filed: May 24, 1973

[21] Appl. No.: 363,605

[52] U.S. Cl. ............... 60/277, 60/285, 123/198 DB, 123/97 B
[51] Int. Cl. ............................................ F02b 75/10
[58] Field of Search .......... 60/277, 285; 123/198 D, 123/198 DB, 97 B

[56] References Cited
UNITED STATES PATENTS

| | | | |
|---|---|---|---|
| 1,869,432 | 8/1932 | King | 123/198 DB |
| 3,263,413 | 8/1966 | Vactor | 60/285 |
| 3,371,914 | 3/1968 | Walker | 123/97 B |
| 3,718,000 | 2/1973 | Walker | 60/285 |
| 3,738,108 | 6/1973 | Goto | 60/277 |

*Primary Examiner*—Douglas Hart
*Attorney, Agent, or Firm*—Paul Fitzpatrick

[57] ABSTRACT

An induction limiting device includes an additional valve below the throttle valve in an engine mounted carburetor. A solenoid with two actuating coils normally holds the valve open against the bias of the spring, with the opening of the switch in response to a specified high catalytic converter temperature disables one of the coils and allows the valve to partially close while the opening of another switch in response to higher catalytic converter temperature disables the other coil and allows the valve to fully close. A switching network is also effective to disable both actuating coils upon simultaneous full throttle closure and engine speed in excess of the speed reference level.

3 Claims, 2 Drawing Figures

PATENTED JUN 25 1974 3,818,701

CARBURETOR INDUCTION LIMITING DEVICE

BACKGROUND OF THE INVENTION

This invention relates to an induction limiting device for an engine mounted carburetor, and particularly to such a device for use with an engine equipped with a catalytic converter in its exhaust system. The requirement of an internal combustion engine for fuel is variable under different operating conditions; and the typical engine carburetor does not always perfectly match the amount of fuel supplied with the amount required. In particular, it is well known that automotive engines normally discharge appreciable quantities of unburned or partially unburned fuel during deceleration, since the high intake manifold vacuum draws excessive amounts of fuel from the idle jet. One method suggested in the past for reducing the emission of such unburned fuel was to close the throttle valve past the idle fuel jet during engine deceleration with apparatus such as that shown in the U.S. Pat. No. 2,926,892 to Wentworth.

The prospective use of catalytic converters to help reduce unburned and partially unburned hydrocarbons from engine exhaust requires a further look at the problem. Such catalytic converters are designed to normally operate at high temperatures; and the heat required to maintain these high temperatures is obtained partly from the residual heat of the exhaust gases and partly from the burning of hydrocarbons within the catalytic converter itself. A sudden infusion of a high concentration of unburned hydrocarbons into the catalytic converter, such as often happens under engine deceleration in the absence or failure of a protective device, might cause the converter to overheat to the point of catalyst or structural failure.

SUMMARY OF THE INVENTION

It is therefore the object of this invention to combine apparatus to reduce the induction of fuel into the engine during deceleration with a backup system to accomplish the same goal should the catalytic converter begin to overheat. In furtherance of this object, an induction limiting valve is included in the carburetor induction bore below the throttle valve. This additional valve is normally held open against the bias of a spring by a solenoid device that is allowed to partially close when catalytic converter temperature reaches a first critical value and to close further when catalytic converter temperature reaches a second critical value or when the throttle valve completely closes at engine speeds greater than a speed reference value. Further details and advantages of this invention will be apparent from the following drawings and detailed description.

SUMMARY OF THE PREFERRED EMBODIMENT

Figure 1:
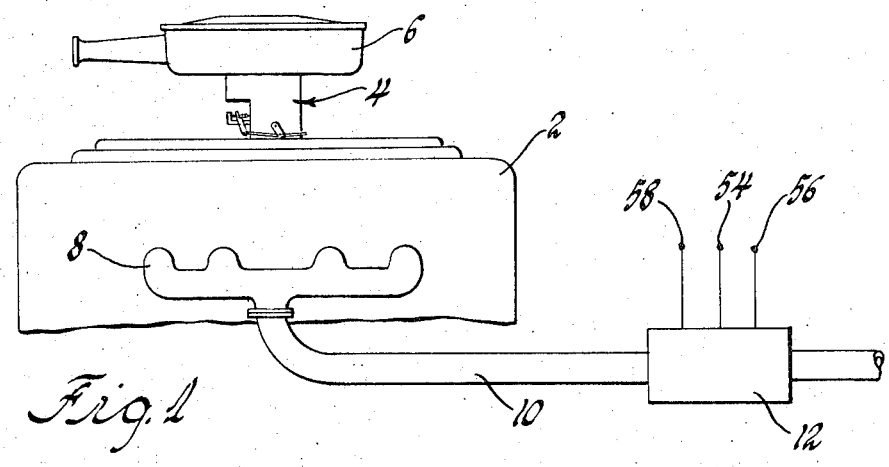
FIG. 1 shows an internal combustion engine with a carburetor and an exhaust system including a catalytic converter.

Referring to FIG. 1, an internal combustion engine 2 has mounted thereon a carburetor 4 and an air cleaner 6 for the mixing and supplying of clean air and fuel thereto. The exhaust products of the combustion within the engine 2, including varying amounts of unburned and partially burned hydrocarbons, are carried from the engine 2 by means of exhaust manifold 8 and exhaust pipe 10 to the catalytic converter 12, in which a catalyst encourages the combustion of the unburned and partially burned hydrocarbons.

Figure 2:
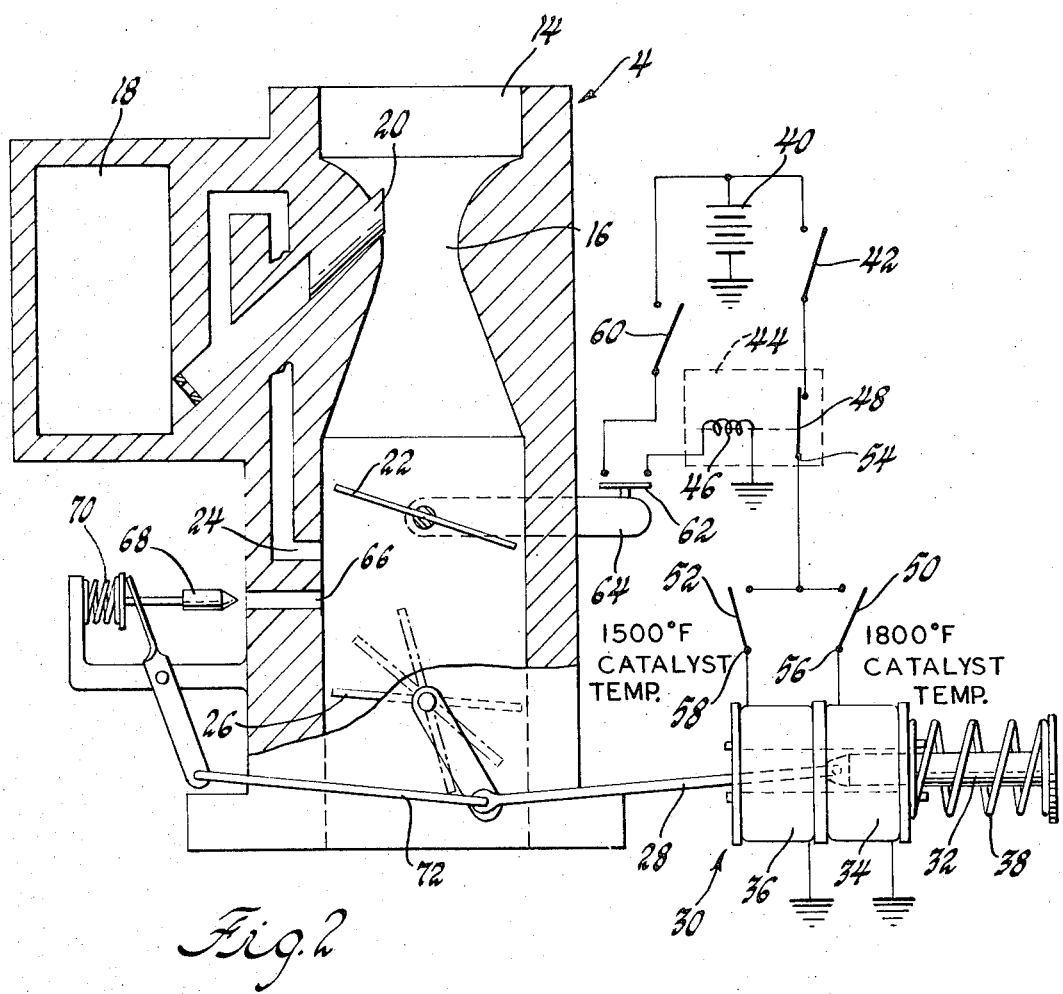
FIG. 2 shows a preferred embodiment of my invention for use with the engine of FIG. 1.

Referring to FIG. 2, the carburetor 4 has an induction bore 14 with a narrowed venturi 16. A fuel bowl 18 serves as a reservoir and supplies fuel through a main jet 20 to the venturi 16 in the conventional manner. As air flows through the venturi 16, the lowered air pressure draws fuel from the main jet 20, which fuel mixes with the air. A throttle valve 22 in the bore 14 just below the venturi 16 controls the rate of flow of the air-fuel mixture through the bore 14 to the engine 2.

When the throttle valve 22 is closed, only a small amount of air can reach the engine 2. Since slow air flow with its resultant small pressure drop in the venturi 16 might draw insufficient fuel from the main jet 20 to keep the engine 2 running, an idle jet 24, also supplied with fuel from the fuel bowl 18, is provided below the throttle valve 22. Enough fuel is drawn from the idle jet 24 into the reduced pressure area below the closed throttle valve 22 to keep the engine 2 running at idle. However, during engine deceleration from a high speed, the fuel introduced through the idle port is found to be less completely burned in the cylinders than when idle conditions prevail. The extra unburned or partially burned fuel is passed on to and oxidized in the catalytic converter 12. The combustion of this fuel causes the temperature in the converter to rise, possibly to the point where the converter is damaged or functionally destroyed.

Therefore, an induction limiting valve 26 is provided in the bore 14 below the throttle valve 22 and idle jet 24. The induction limiting valve 26 is shown in its closed position, in which it greatly reduces the pressure drop at the idle jet 24 and thus the amount of fuel supplied to the engine. The exact amount of closure for this closed position can be calculated for any specific carburetor to reduce the hydrocarbons to a level that the catalytic converter 12 could handle or to a lower level in order to shut off the engine completely, whichever is desired.

The induction limiting valve 26 is movable to partially closed and open positions, indicated by the broken lines in FIG. 2, by the armature 32 of a solenoid means 30 through a linkage 28. The solenoid 30 has two coaxial solenoid actuating coils 34 and 36 surrounding the armature 32. The armature 32 is normally biased to the end of the solenoid means opposite the induction limiting valve by a spring 38. The armature 32 is magnetically responsive and will be drawn within the solenoid means 30 by actuating coil 34 to move the induction limiting valve 26 to its partially closed position and by actuating coils 34 and 36 together to move the induction limiting valve to its open position.

A source of electric current 40, such as a battery, is provided. One side of the battery 40 is grounded while the other side is connected to a main power switch 42. If the engine 2 is vehicle mounted, the battery 40 could be the vehicle battery and the switch 42 the vehicle ignition switch. A relay 44 is provided having an actuating coil 46 and a normally closed armature 48. The normally closed armature 48 comprises a switch one end of which is connected to the other end of the switch 42.

A pair of temperature sensitive switches 50 and 52 are located within the catalytic converter or in some other location where they are sensitive to temperatures within the catalytic converter. Both of these temperature responsive switches 50 and 52 are normally closed at low temperatures. Switch 52 opens when catalyst temperature reaches a low temperature reference level such as 1,500° F, and switch 50 opens when catalyst temperature reaches a high temperature reference level such as 1,800° F. One side of each of the switches 50 and 52 is connected to the other end 54 of the armature 48. The other end 56 of switch 50 is connected through coil 34 to ground, and the other end 58 of switch 52 is connected through coil 36 to ground.

An engine speed responsive switch 60 is provided which is open below a speed reference level and is closed above that level. A throttle closure switch 62 is provided which is closed by a linkage 64 attached to throttle valve 22 only when the throttle valve 22 assumes its fully closed position. The engine speed responsive switch 60, throttle closure responsive switch 62 and actuating coil 46 of the relay coil 44 are connected in series with the source of electric power 40. It can thus be seen that the armature 48 of the relay 44, together with the engine speed responsive switch 60, throttle closure responsive switch 62 and actuating coil 46, comprises an engine speed and throttle closure responsive switch which is normally closed but which opens when engine speed exceeds the speed reference level and the throttle valve 22 is simultaneously closed.

The operation of the device will now be described. The device is actuated by the closure of the switch 42. Under normal conditions this closes a circuit including the source of electric power 40, switch 42, armature 48, switches 50 and 52 and coils 34 and 36. The armature 32 is thus pulled against the bias of spring 38 to open the induction limiting valve 26 to its open position. Any time that the throttle 22 is completely closed while the engine is running at a speed greater than the speed reference level, the armature 48 is pulled open, both coils 34 and 36 are disabled and the spring 38 closes the induction limiting valve 26 to its fully closed position. When either of switches 60 and 62 opens, the armature 48 returns to its normally closed position, and actuating coils 34 and 36 cause the induction limiting valve to open again.

If, for any reason, sufficient hydrocarbons reach the catalytic converter 12 to raise the temperature to 1,500° F, switch 52 opens and disables actuating coil 56. Since actuating coil 34 is still actuated, the spring 38 causes the induction limiting valve 26 to be closed to its partially closed position. Should the reduction in hydrocarbons caused by a partial closure of the induction limiting valve prove insufficient to control catalyst temperature, when catalyst temperature reaches 1,800° F switch 50 opens, thus disabling actuating coil 34 and allowing the spring 38 to return the induction limiting valve to its fully closed position. Of course, return of catalyst temperature below 1,800°F or 1,500° F causes switches 50 and 52, respectively, to close and the induction limiting valve 26 to open.

One optional feature is left for description. If it is found, in a given carburetor design, that closure of the induction limiting valve 26 still allows sufficient hydrocarbons to enter the catalytic converter and raise the temperature therein, a vent 66 can be provided to open a portion of the bore between the throttle valve 22 and induction limiting valve 26 to atmosphere. A valve 68 would be normally biased by a spring 70 to close the vent 66; however, a linkage 72 linked to the induction limiting valve 26 would open the valve 68 when the induction limiting valve 26 was in its fully closed position to allow the influx of air through the vent 66 into the bore 14 for protective leaning of the air-fuel mixture that gets past the induction limiting valve 26.

From the preceding description, it can be seen that our invention provides failsafe protection against catalyst overheating due to excessive unburned and partially unburned hydrocarbons during deceleration of an internal combustion engine. Since other embodiments of our invention will undoubtedly occur to those skilled in the art, the invention should be limited only by the claims which follow.

We claim:

1. An induction limiting device for use with an engine mounted carburetor and a catalytic converter, said carburetor having a bore for induction of air therethrough to said engine and a throttle valve in said bore to vary the induction of air therethrough, said catalytic converter being located in the exhaust system of said engine for the treatment of exhaust gases therefrom, said device comprising, in combination:

an induction limiting valve in said bore downstream from said throttle valve, said induction limiting valve having an open position, a partially closed position and a fully closed position, said induction limiting valve being biased toward its fully closed position;

solenoid means effective to open said induction limiting valve;

a source of electric current;

switch means responsive to catalytic converter temperature, said temperature responsive switch means being connected between said solenoid means and said current source and varying the current supplied to said solenoid to open the induction limiting valve to its partially open position when said reference temperature is between high and low reference levels and to its fully open position when said reference temperature is below said low reference level; and switch means responsive to engine speed and throttle position, said engine speed and throttle position responsive switch means also being connected between said solenoid and said current source and being effective, when engine speed exceeds a speed reference level and said throttle valve is simultaneously in its closed position, to deenergize said solenoid means, whereupon said induction limiting valve returns to its closed position.

2. An induction limiting device for use with an engine mounted carburetor and a catalytic converter, said carburetor having a bore for the induction of air to said engine and a throttle valve in said bore to vary the induction therethrough, said catalytic converter being located in the exhaust system of said engine for the treatment of exhaust gases therefrom, said device comprising, in combination:

an induction limiting valve in said bore downstream from said throttle valve, said induction limiting valve having an open position, a partially closed position and a fully closed position, said induction limiting valve being biased toward said fully closed position;

a source of electric current;

switch means responsive to engine speed and throttle position, said engine speed and throttle position responsive switch means normally establishing a closed circuit therethrough but opening said circuit when engine speed exceeds a speed reference level and said throttle valve is simultaneously in its closed position;

first and second switch means responsive to catalytic converter temperature, said first temperature responsive switch means being closed at temperatures below a high temperature reference level and open at temperatures above said high temperature level; said second temperature responsive switch means being closed at temperatures below a low temperature reference level and open at temperatures above said low temperature reference level; and solenoid means having a first actuating coil connected through said first temperature responsive switch means and said engine speed and throttle position responsive switch means in series to said current source, a second actuating coil connected through said second temperature responsive switch means and said engine speed and throttle position responsive switch means in series to said current source, and armature means attached to said induction limting valve, said armature means being responsive to the actuation of said first actuating coil to hold said induction limiting valve in its partially closed position and responsive to the actuation of both actuating coils to hold said induction limiting valve in its open position.

3. An induction limiting device for use with an engine mounted carburetor and a catalytic converter, said carburetor having a bore for the induction of air to said engine and a throttle valve in said bore to vary the induction therethrough, said catalytic converter being located in the exhaust system of said engine for the treatment of exhaust gases therefrom, said device comprising, in combination:

an induction limiting valve in said bore downstream from said throttle valve, said induction limiting valve having an open position, a partially closed position and a fully closed position, said induction limiting valve being biased toward said fully closed position;

a source of electric current;

engine speed responsive switch means opening when engine speed falls below a speed reference level and closing when engine speed exceeds said speed reference level;

throttle closure responsive switch means closing when said throttle valve closes fully and opening when said throttle velve opens;

a relay having an actuating coil connected through said throttle closure responsive switch means and said engine speed responsive switch means in series to said current source, said relay also having a normally closed armature openable by said actuating coil;

first switch means responsive to catalytic converter temperature, said first temperature responsive switch means being closed at temperatures below a high temperature reference level and open at temperatures above said high temperature reference level;

solenoid means having first and second actuating coils, said first actuating coil being connected through said first temperature responsive switch means and said normally closed armature in series to said current source, said solenoid means being effective with said first actuating coil actuated to hold said induction limiting valve in its partially open position; and second switch means responsive to catalytic converter temperature, said second temperature responsive switch means being closed at temperatures below a low temperature reference level and open at temperatures above said low temperature reference level, said second actuating coil being connected through said second temperature responsive switch means and said normally closed armature in series to said current source, said solenoid means being effective with said first and second actuating coils actuated to hold said induction limiting valve in its open position.

* * * * *